United States Patent [19]

Venkatu

[11] 4,278,153
[45] Jul. 14, 1981

[54] BRAKE FRICTION MATERIAL WITH REINFORCEMENT MATERIAL

[75] Inventor: Doulatabad A. Venkatu, Stow, Ohio

[73] Assignee: Goodyear Aerospace Corporation, Akron, Ohio

[21] Appl. No.: 963,621

[22] Filed: Nov. 24, 1978

[51] Int. Cl.³ .............................................. F16D 69/02
[52] U.S. Cl. .......................... 188/251 M; 75/208 R; 188/73.2; 192/107 M; 428/558
[58] Field of Search ............. 188/250 B, 251 M, 73.2, 188/73.1, 258, 255, 264 A, 264 AA, 71.6; 192/107 M; 75/208 R; 428/553, 558

[56] References Cited

U.S. PATENT DOCUMENTS

| | | | |
|---|---|---|---|
| 642,295 | 1/1900 | Cardwell | 188/255 |
| 665,298 | 1/1901 | Wolhaupter | 188/255 |
| 2,783,529 | 3/1957 | Huntress | 188/251 M |
| 2,945,292 | 7/1960 | Luther, Jr. et al. | 75/208 R X |
| 3,002,834 | 10/1961 | Pasquale | 428/553 X |
| 3,027,979 | 4/1962 | Pocock | 188/73.1 |
| 3,068,016 | 12/1962 | Dega | 428/557 X |
| 3,534,464 | 10/1970 | Lallemant | 228/176 |
| 3,844,011 | 10/1974 | Davies | 75/208 R X |

FOREIGN PATENT DOCUMENTS

| | | | |
|---|---|---|---|
| 657545 | 2/1963 | Canada | 188/251 M |
| 663012 | 5/1963 | Canada | 188/251 M |

*Primary Examiner*—George E. A. Halvosa
*Attorney, Agent, or Firm*—P. E. Milliken; E. W. Oldham; R. L. Weber

[57] ABSTRACT

A brake disk frictional module is provided, composed of sintered metallic material reinforced throughout its entire volume by a grid system of pure metal or metallic alloy. The friction module may be manufactured by sintering the metallic material with the grid reinforcement in either a mold or within the brake disk cup. The internal reinforcement of the frictional module prevents spalling weight loss, friction coefficient decay, or other physical defect as caused by frictional strain during use. The reinforcement material reduces the overall temperature of the disk during use, and aids frictional coefficient of the disk because of the metallic compatibility of the metallic material and grid system.

24 Claims, 5 Drawing Figures

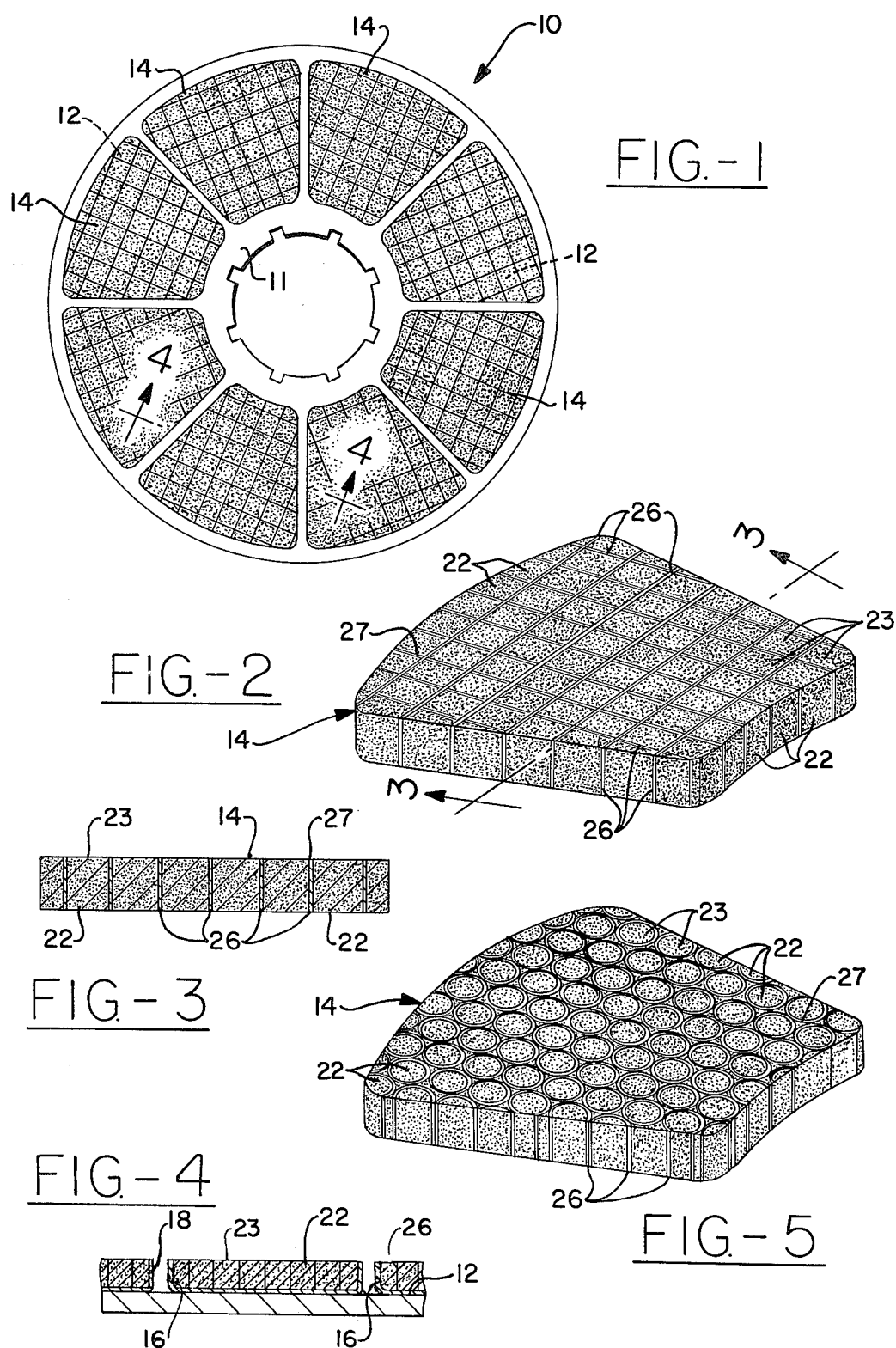

BRAKE FRICTION MATERIAL WITH REINFORCEMENT MATERIAL

BACKGROUND OF THE INVENTION

The present invention relates to frictional surfaces of brake disks, wherein the frictional properties are improved by the employment of reinforcement material substantially throughout the depth of the frictional surfaces.

Heretofore, a multitude of structures for frictional engagement of two materials have been disclosed. More particularly, these frictional surfaces have found great utility in braking mechanisms for various vehicles and machinery, clutch mechanisms for the same, and other devices which require the engagement of two materials along an axis where no interlocking engaging means can exist.

Because the frictional surfaces must withstand the tremendous pressures and temperatures exerted by contact of the two materials, the materials comprising these frictional surfaces have generally been made from carbonized material or various metals. These materials are generally bonded to the internal structural supports, and the entire frictional properties of the system depend on the type of material employed. Examples of this type of frictional structure have been disclosed by U.S. Pat. Nos. 1,935,713; 2,821,271; 2,973,336; 2,251,410; 2,783,529; 2,966,737; 2,850,118 and 3,191,734. The structure taught by each of these patents do not rely on any other material for additional support and resistance to the frictional strain.

Other approaches to the design of a good frictional surface which may be reinforced by various structures to improve its frictional properties and intended purposes. In some cases, the art has taught the employment of reinforcement means for engaging the frictional material to the supporting structure of the entire system. In this manner, greater anchoring of the frictional material to the supporting hardware of the system is achieved. There is no effect on the frictional characteristics of the frictional material along its surface. U.S. Pat. No. 1,470,475, U.S. Pat. No. 1,880,750, U.S. Pat. No. 2,911,074, and U.S. Pat. No. 2,948,361 disclose this structure as described, whereby reinforcement material secures the frictional material to the supporting structure. Frictional material reinforced only near the supporting structure does not adequately prevent spalling of the frictional surface upon contact with other surfaces during use.

Another reinforcement system teaches the placing of the reinforcement material entirely within the frictional material, whereby greater internal structural support of the frictional material is achieved. This internal reinforcement may assume a variety of configurations, including a special structure for later securing that embedded material to the supporting structure of the frictional system. U.S. Pat. Nos. 1,182,368; 2,464,437; 2,818,634; 3,064,343 and 3,698,526 disclose internally embedded reinforcement of the frictional material. Reinforcement material embedded within the frictional material but not connected to other reinforcement material or the upper or lower surface of the frictional material does not provide adequate reinforcement throughout the entire volume of the frictional material.

Yet another type of reinforcement mechanism is the employment of reinforcement materials at the outer surface of the frictional material. As disclosed by U.S. Pat. Nos. 2,160,770 and 2,728,700, exposure of the reinforcement material at the surface of the frictional material is designated for increased wear resistance without support of the reinforcement material back to the supporting structure of the frictional system. Reinforcement material contained in the frictional material at the functional surface does not provide adequate reinforcement of the frictional material near the supporting structure of the frictional system.

In some designs, the reinforcement material has been placed in uniform layers or disparate scattering to assure reinforcement in a direction parallel to the frictional surface of the entire system. U.S. Pat. No. 587,493, U.S. Pat. No. 2,747,701, U.S. Pat. No. 3,345,734, and U.S. Pat. No. 3,390,750 disclose systems where the reinforcement material is interlocked or associated in a direction parallel to the frictional surface. Horizontal reinforcement material throughout the frictional material without vertical interconnection provides a layered reinforcement mechanism which does not adequately reinforce the full depth of the frictional material.

Reinforcement of the frictional surfaces to the frictional system has assumed a direction perpendicular to the frictional surface. As disclosed by U.S. Pat. No. 374,427, this reinforcement may be achieved by the use of soft metal rods embedded in the cast iron frictional material. There is no interconnection provided between the various rods in the frictional system, which seriously limits the scope of interconnected reinforcement. Likewise, the use of thin partition members as vertical members is disclosed by U.S. Pat. No. 1,557,668. In this patent, the thin partition members provide separation of the composition during the manufacture of the frictional system. The vertical partition members are removed after initial formation of the composition comprising the frictional material, their presence being required to separate various formulae of composition for the frictional material during the process of manufacture. Vertical reinforcement material in the frictional material as taught by these two patents does not provide adequate reinforcement across the width of the frictional material.

U.S. Pat. No. 199,161 discloses a system whereby the frictional material is embedded in a frame composed of a material having less desirable frictional characteristics. Through this system of embedment, the frictional material is restrained in position by the formation of the frame. Placing the frictional material in a frame provides outside support but achieves no inner reinforcement.

U.S. Pat. No. 3,534,464 discloses the material of the frame extending into the saucer reserved for the frictional surface. This additional framework within the saucer provides additional reinforcement of the frictional material in the saucer to the frictional system. This reinforcement comprising a ribbed structure is welded in place in the saucers at the same time the frictional surfaces are sintered during assembly of the entire frictional system. The welded junction of the ribbed structures secures the reinforcement, against which the frictional material is sintered. Incorporating an internal welded framework into the area in which the frictional material resides cannot adequately reinforce the frictional material without becoming a frictional component itself and thereby having to exhibit frictional properties compatible with the frictional material itself.

U.S. Pat. No. 3,391,763 discloses a frictional system having rod-shaped heat transfer elements located on the obverse side of the frictional system. This structure provides ventilation to those heat transfer elements with a system of spacers embedded in the obverse side of the frictional system. Use of heat transfer elements to the obverse side of a frictional surface does not reinforce the frictional material at the frictional surface.

Besides resisting breakdown as caused by the results of destructive frictional forces, the frictional system must serve its purpose of providing a good frictional contact at its surface to engage other surfaces and transfer or inhibit power and momentum. The placing of too many reinforcement materials not having the same frictional coefficient as the frictional material disrupts the beneficial performance of the frictional system, even though the durability of the frictional system is enhanced. The reinforcement material supplants the frictional material as the true frictional surface, thereby seriously affecting overall beneficial frictional performance.

SUMMARY OF THE INVENTION

Consequently, it is an object of this invention to provide a frictional system whereby the entire frictional material is reinforced in a horizontal and vertical fashion.

Another object of the invention is to provide a frictional system whereby the reinforcement material extends throughout the entire depth of the frictional material.

Still another object of the invention is to provide a frictional system whereby frictional material is reinforced throughout its entire length and width.

Yet another object of the invention is to provide a frictional system whereby the reinforcement material prevents potential spalling of weak mixes of materials constituting the frictional material.

Still another object of the invention is to provide a frictional system whereby reinforcement material would isolate the frictional surface into small units in area to prevent massive spalling of the frictional surface.

Yet another object of the invention is to provide a frictional system whereby the frictional material may be reinforced by a frictional material using a sintering process conducted outside of the frictional system.

Another object of the invention is to provide a frictional system whereby the supporting structure of the frictional system has recessed areas into which the reinforced frictional material may reside.

Yet another object of the invention is to provide a frictional system whereby reinforcement material contained within the friction material reinforces the frictional properties of the frictional material rather than the engagement of the frictional material with the supporting structure.

Yet another object of the present invention is to provide a frictional system whereby the frictional material has a similar frictional coefficient to that of unreinforced frictional systems with respect to a third surface, thereby achieving beneficial frictional properties.

Still another object of the present invention is to provide a frictional system whereby the reinforcement material yields a frictional system having smaller coefficient decay, cooler temperatures, reduced frictional weight loss, and a smoother wear upon the frictional surfaces.

These objects, and other objects which will become apparent as the description of the preferred embodiment proceeds, are achieved by a brake disk, comprising: an annular disk having a multiplicity of recesses; a multiplicity of frictional modules, each said frictional module residing in each said recess; said frictional modules having a friction material and a reinforcement material; and said friction material and said reinforcement having upper surfaces exposed from said annular disk recesses. The objects of the invention are also achieved by: a brake disk having a high coefficient of friction, comprising an annular disk having several frictional surfaces; each said frictional surface having a friction pad, said friction pad having a depth and a reinforcement means for improving the frictional performance of the brake disk, said reinforcement means extending substantially through the depth of said frictional surface; each said frictional surface having a recess wherein each said friction pad resides, and said reinforcement means in said friction pad substantially connected to said friction pad, said friction pad substantially connected to said annular disk. Further, the objects of the invention are achieved by a process for forming a high-coefficient brake disk friction surface comprising: sintering a friction material and a reinforcement material into a frictional module, inserting said frictional module into a recess of an annular disk, said frictional module having a shape substantially equivalent to the shape of said recess; and heating said frictional module and said annular disk, wherein said frictional material of said frictional module sinters with said recess of said annular disk.

DESCRIPTION OF THE DRAWINGS

In order to have a complete understanding of the structure of the present invention, as described in its best known and preferred embodiment, reference is had to the following drawings:

FIG. 1 is a top plan view of the assembled frictional system in the form of a brake disk;

FIG. 2 is a perspective view of the frictional module;

FIG. 3 is a cross-sectional view of the frictional module taken on line 3—3 of FIG. 2;

FIG. 4 is a cross-sectional view of the frictional system in the form of a brake disk taken on line 4—4 of FIG. 1; and, FIG. 5 is a perspective view of another embodiment of the frictional module.

DETAILED DESCRIPTION OF THE PREFERRED EMBODIMENTS

Referring now to FIG. 1, an understanding of the brake disk as the best known and preferred embodiment of the frictional system may be achieved. The brake disk, generally referred to by the numeral 10, is composed of an annular disk 11 having a multiplicity of disk cups 12 extending from the surface thereof (having recesses generally shown by dotted lines), and a multiplicity of frictional modules 14 which reside in the disk recesses 12. The annular disk 11 and disk cups 12 may be made from a sturdy material known to those skilled in the art for providing a supporting structure for frictional systems such as steel. The annular disk 11 may be in the form of a stator or a rotor, both configurations being used in a typical or conventional brake stacking system to achieve frictional contact between the frictional modules 14 of alternating rotors and stators.

Referring now to FIG. 2, a prospective view of the frictional module 14, an understanding of its structure may be achieved. The frictional module 14 is composed of a frictional material 22 and a reinforcement material 26. Both materials 22 and 26 have upper surfaces. 23 and 27, respectively, which are exposed from the disk cups 12 of the annular disk 11. In the preferred embodiment, the frictional material 22 is made from a sinterable metallic mixture. Preferably, the mixture comprises powders of copper, iron, and other known sinterable metals. This sinterable mixture has excellent frictional properties, but when placed in a frictional system, it is susceptible to spalling when not reinforced by other material.

The reinforcement material 26 is made from a pure metal or alloy which has friction coefficients similar to the friction coefficients of the frictional material 22, in order to render these materials compatible to minimize deleterious effects caused by thermal expansion during use. Copper is the preferred pure metal. Preferably, the alloy comprises copper and other copper metals compatible with the sinterable components of frictional material 22. Further compatibility may be achieved by plating an alloy with a pure metal such as copper. Not only does the reinforcement material 26 provide mechanical reinforcement to the frictional material 22, but also the reinforcement material 26 does not adversely affect wear resistance as caused by incompatible interfaces.

The frictional module 14 may be produced outside of the annular disk by sintering the reinforcement material 26 to the frictional material 22 in a mold having substantially the same shape as cup 12. Alternately, the entire sintering operation may occur within disk cups 12. As can be seen by reference to FIG. 3, the reinforcement material 26 extends substantially the depth of the frictional material 22. Referring again to FIG. 2, the reinforcement material 26 and frictional material 22 substantially extend both the length and width of the frictional material. The frictional module 14 therefore is composed of a grid-like structure of reinforcement material 26 around which the frictional material 22 is sintered. As well known to those skilled in the art, the process of sintering a mixture of metallic powders forms a homogeneous mass without the melting of the individual metal powder particles. In the preferred copper embodiment, the sintering of frictional material 22 either within cup 12 or within a module mold occurs at a temperature of approximately 845°–890° C. with 870° C. being the most preferable temperature. A substantially higher temperature than this sintering temperature close to melting point would produce a weld of copper frictional material 22 and copper metal reinforcement material 26 which would melt the copper particles and the copper metal to form an integral mass seriously and deleteriously affecting the frictional properties of the frictional module 14.

When the frictional module 14 has been externally molded, it may be then inserted into disk cup 12 of annular disk 11. The cup 12 is heated to a sintering temperature from about 1000° C. to about 1030° C., with 1015° C. being the preferred temperature, allowing the frictional material 22 to sinter to the interior surfaces 16 of disk cup 12. The cups 12 containing modules 14 are then attached to annular disk 11, according to methods known to those skilled in the art (not shown in FIG. 4).

If the annular disk is composed of steel or another alloy which is not compatible with the mixtures comprising frictional material 22, an intermediate step allowing the formation of an interlayer 18 on the interior surfaces 16 of disk recess 12 is performed. Typically, a copper plating operation occurs whereby copper plating, approximately 0.0002 inch thick is placed on the interior surfaces 16 of disk cup 12. The slight thickness of interlayer 18 prevents cross-sectional display in FIG. 4. With interlayer 18 plated to the interior surface 16 of disk cup 12, another sintering operation occurs to sinter the frictional material 22 to interlayer 18. The preferred sintering temperatures are far below the temperature whereby the metal powder particles may melt and coalesce. It is fundamentally critical to prevent any melting of metal particles to the reinforcement material 26 which would disrupt the aggregate nature of the frictional material 22.

As reinforcement materials, copper and steel are probable choices. Testing of these two materials as the reinforcement material 26 confirms that a copper reinforcement material 26 is the preferred material, demonstrating a number of unexpected beneficial properties synergistically improving frictional performance. Both durability and rejected take off (RTO) tests have been run. The results of these tests are delineated in Tables I and II disclosed below. The base line is a frictional material 22 without reinforcement. Tests on the copper and the steel reinforced frictional modules 14 were identical, all conditions being constant.

TABLE I

| PERFORMANCE OF REINFORCED MIXTURE UNDER DURABILITY CONDITIONS | | | | |
|---|---|---|---|---|
| | | COPPER REINFORCED | | |
| TEST | CONTROL | TEST 1 (Copper Metal) | TEST 2 (Copper Alloy) | STEEL REINFORCED |
| Hardness | 82 | 85 | 87 | 82 |
| Rotating Disk Wear/Face/Stop | .000061 | .000068 | .0000316 | .0000082 |
| Stationary Disk Wear/Face Stop | .00017 | .00011 | .0009 | .00002 |
| Pressure Plate Wear/Face/Stop | .00008 | .00008 | .0002 | .00001 |
| Rotating Disk Wt Loss | .150 | .139 | .1958 | .089 |
| Stationary Disk Wt Loss | .015 | .0029 | .0256 | .0441 |
| Pressure Plate Wt Loss | .009 | .0020 | .0035 | .027 |
| Stop #5 Coeff't | .347 | .311 | .298 | .238 |
| Coeff't Decay | .064 | .002 | .034 | .085 |
| Brake Pressure | 485 | 480 | 591 | 1102 |
| Stop Time | 16.0 | 15.6 | 18.68 | 15.7 |
| Coefficient | .362 | .370 | .304 | .157 |
| Torque | 562 | 617 | 630 | 618 |
| Torque Peak Ratio Min. | 1.18 | 1.06 | 1.28 | 1.20 |
| Torque Peak Ratio Max. | 1.98 | 1.79 | 1.95 | 2.90 |

TABLE I-continued
PERFORMANCE OF REINFORCED MIXTURE UNDER DURABILITY CONDITIONS

| TEST | CONTROL | COPPER REINFORCED | | STEEL REINFORCED |
| --- | --- | --- | --- | --- |
| | | TEST 1 (Copper Metal) | TEST 2 (Copper Alloy) | |
| Stationary Disk Temp. Rise | 1024 | 942 | 1104 | 989 |

As can be seen by examining Table I for the two tests of the copper reinforced frictional module 14, in comparison with the control, a similar frictional coefficient was achieved with improvements such as a smaller coefficient decay, an overall cooler brake, a smoother brake wear, and a lower stationary disk and pressure plate weight loss.

In comparison, the steel reinforcement material 26 of the frictional module 14 provided a significantly lower friction coefficient, a higher stationary disk and pressure plate wear, and a higher coefficient decay.

TABLE II
PERFORMANCE OF REINFORCED MIXTURE UNDER REJECTED TAKE OFF CONDITIONS

| TEST | CONTROL | COPPER REINFORCED | | STEEL REINFORCED |
| --- | --- | --- | --- | --- |
| | | TEST 1 (.015" strip) | TEST 2 (.032" ring) | |
| Hardness | 70 | 77 | | 84 |
| Brake Pressure | 1155 | 1175 | 1190 | 1185 |
| Stop Time | 16.4 | 17.3 | 16.6 | 15.2 |
| Coefficient | .212 | .197 | .203 | .222 |
| Torque | 860 | 900 | 950 | 950 |
| Peak Torque | 1402 | 1597 | 1485 | 1802 |
| Stack Wt Loss | .65 | .9258 .566 | .7496 | |
| Stationary Disk Temp. Rise | 1825 | 1640 | 1590 | 1750 |
| Stop Dist (Revs) | 460 | 492 | 460 | 430 |
| Fushion of Brake After Rejected Take Off | Yes | No | No | Yes |

Referring now to Table II, the copper reinforcement material 26 provided essentially similar frictional characteristics compared to the control when undergoing rejected take off (RTO). However, a most beneficial property is seen, in that the copper reinforcement material 26 in the frictional module 14 reduces the overall temperature of the frictional module 14. Unlike that found in the control, after the RTO test, there was no fusion in the copper reinforced frictional module 14. In comparison to the copper reinforcement, the steel reinforcement material 26 in the frictional module 14 provides essentially a similar friction coefficient as the control, but the added reinforcement of steel exhibited a higher torque peak and a higher stack weight loss. The frictional module cooler than that of the control, but still warmer than the temperature of the copper reinforced frictional module 14. Further, the steel reinforced frictional module 14 fused after RTO as did the control.

The most significant property in comparison on both Tables I and II is the coefficient of friction. The coefficient of friction in the control is much greater than that achieved by the steel reinforcement as shown in Table I, but substantially equal to the coefficient of friction for the copper reinforcement. The improvements of other frictional properties without adverse effect on the frictional coefficient value is an unexpected and desirable property achieved by a copper reinforcement structure. Therefore, durability of performance of a brake disk not under extreme conditions renders it preferable to utilize a copper reinforcement frictional module 14 rather than its steel reinforcement counterpart. This is further made apparent by an examination of the temperature rise for both Tables I and II of the various structures tested. In both Tables, the copper reinforced frictional module 14 achieved an unexpected and significantly lower temperature rise than the other structures. The combination of the improved coefficient of friction during durability testing and heat dissipation under all conditions of use suggests that copper reinforcement material 26 is more compatible with frictional material 22 than steel, such that a frictional module 14 having unexpectedly improved performance characteristics is produced. The frictional compatibility of copper reinforcement material 26 with frictional material 22 yields synergistic results with the substantial reinforcement obtained.

After installation is complete, the upper surfaces 23 and 27 of both materials 22 and 26 are flush with disk cup 12 in order to engage other frictional surfaces. According to the tests demonstrated in Tables I and II, and the discussion pertaining thereto, the use of copper as a reinforcement material 26 unexpectedly improves the coefficient of friction for the surfaces of the frictional module 14. By extending substantially throughout the entire volume of the frictional module 14, the reinforcement material 26 prevents spalling or other physical breakdown at any point in the frictional material 22.

The shape of the reinforcement material 26 may take any form such as the grid-like appearance displayed in FIG. 2. Additionally, it is possible to arrange a honeycomb effect of cylinders extending the depth of the frictional module 14 and join together on their curved surfaces as shown in FIG. 5. The grid or honeycomb appearance of FIGS. 2 and 5 may be altered by substituting any structure of reinforcement material 26 extending throughout the depth, width, and length of the frictional module 14 without departing from the scope of this invention. Preferably, improvement to frictional performance is achieved when the reinforcement material 26 occupies approximately 7–12% of the surface area and 11–19% of the volume of frictional module 14. The reinforcement material 26, as explained hereinabove in the preferred embodiment, provides improved mechanical reinforcement as synergistically joined with unexpected compatible frictional reinforcement. Therefore, any structure which accomplishes this task throughout the substantial or the entire volume of the frictional module 14 is within the disclosure of this invention.

As described above in the Background Of The Invention, there have been a multitude of patents relating to the type of reinforcement mechanism for the frictional material against the supporting structure of the frictional system. Here, the support between frictional module 14 and the interior surfaces 16 having interlayer 18 is achieved by the sintering of frictional material 22 onto the interlayer 18. The internal integrity of frictional module 14 is maintained by reinforcement material 26 extending substantially throughout the entire volume of frictional material 22.

While it is recognized that the best known and preferred embodiment of the present invention comprising a copper reinforcement of a frictional module has been disclosed in accordance with the Patent Statutes, it is apparent that modification of this embodiment to achieve similar structural significance does not depart from the scope of the invention.

What is claimed is:

1. A brake disk, comprising:
   (a) an annular disk;
   (b) a multiplicity of cups secured to said disk; and
   (c) a multiplicity of frictional modules, one said frictional module residing in each said cup;
   each said module comprising a grid of substantially copper-containing reinforcement material and a quantity of copper-containing sintered frictional material reinforced through said entire quantity by said grid, said grid and frictional material being separate and distinct elements of the module;
   said substantially copper-containing grid being compatible with said copper-containing sintered frictional material in coefficient of friction properties;
   said quantity of copper-containing sintered frictional material having outer surfaces sintered to said cup and both said friction material and said reinforcement grid having upper surfaces exposed from said annular disk cups, said grid being free of direct attachment to said cups.

2. A brake disk according to claim 1, wherein said frictional material had a depth and said reinforcement material has a depth, said reinforcement material depth being substantially equal to said friction material depth.

3. A brake disk according to claim 2, wherein said frictional material comprises a sintered copper mixture, and said reinforcement material comprises a copper alloy.

4. A brake disk according to claim 3, wherein said annular disk cup comprises steel.

5. A brake disk according to claim 4, wherein each said annular disk cup has a copper plating interlayer against which said copper-containing frictional material of said frictional module sinters.

6. A brake disk according to claim 5, wherein said annular disk has a steel-copper plating interface between each said cup and each said cup interlayer.

7. A brake disk according to claim 6, wherein said annular disk has a copper plating-sintered copper mixture interface between each said cup interlayer and said frictional material.

8. A brake disk according to claim 7, wherein said annular disk has a sintered interface between said sintered copper mixture of said frictional material and said copper alloy of said reinforcement material.

9. A brake disk according to claim 8, wherein said copper alloy of said reinforcement material comprises pure copper metal.

10. A brake disk according to claim 8, wherein said annular disk is a rotor.

11. A brake disc according to claim 8, wherein said annular disk is a stator.

12. A process for forming a high-coefficient brake disc surface, comprising:
   gathering copper-containing frictional material, a grid of substantially copper-containing reinforcement material compatible with said frictional material in coefficient of friction properties and an annular disk having cups;
   sintering said frictional material with said grid into a frictional module at temperature from about 845° C. to about 890° C., said grid reinforcing said frictional material throughout the entire volume of said frictional module;
   inserting said frictional module into said cup of said annular disk, said frictional module having a shape substantially equivalent to the shape of said cup; and,
   heating said frictional module and said annular disk at temperatures below the melting point of copper and from about 1000° C. to about 1030° C., wherein only said frictional material of said frictional module sinters with said cup of said annular disk with said grid remaining free of direct attachment to said cup.

13. A brake disk according to claim 12, wherein said frictional material has a depth and said reinforcement material has a depth, said reinforcement material depth being substantially equal to said friction material depth.

14. A brake disk according to claim 13, wherein said frictional material comprises a sintered copper mixture, and said reinforcement material comprises a copper alloy.

15. A brake disk according to claim 14, wherein said annular disk cup comprises steel.

16. A brake disk according to claim 15 wherein each said annular disk cup has a copper plating interlayer against which said copper-containing frictional module sinters.

17. A brake disk according to claim 16, wherein said annular disk has a steel-copper plating interface between each said cup and each said cup interlayer.

18. A brake disk according to claim 17, wherein said annular disk has a copper plating-sintered copper mixture interface between each said cup interlayer and said frictional material.

19. A brake disk according to claim 18, wherein said annular disk is a rotor.

20. A brake disk according to claim 18, wherein said annular disk is a stator.

21. A brake disk according to claim 18, wherein said sintering occurs at approximately 870° C.

22. A brake disk according to claim 18, wherein heating occurs at approximately 1015° C.

23. A brake disk according to claim 18, wherein said annular disk has a sintered interface between said sintered copper mixture of said frictional material and said copper alloy of said reinforcement material.

24. A brake disk according to claim 13, wherein said copper alloy of said reinforcement material comprises pure copper metal.

* * * * *